United States Patent [11] 3,632,359

[72] Inventors Allen M. Alper;
 Ronald M. Lewis; Robert N. McNally, all of Corning, N.Y.
[21] Appl. No. 780,175
[22] Filed Nov. 29, 1968
[45] Patented Jan. 4, 1972
[73] Assignee Corhart Refractories Company
 Louisville, Ky.

[54] $ZRO_2 - AL_2O_3 - SIO_2$ FUSION-CAST REFRACTORY
 12 Claims, No Drawings
[52] U.S. Cl. .................................................... 106/57
[51] Int. Cl. .................................................... C04b 35/48
[50] Field of Search .......................................... 106/57

[56] References Cited
 UNITED STATES PATENTS
2,271,369  1/1942  Fulcher et al. ................. 106/57

Primary Examiner—James E. Poer
Attorneys—Clarence R. Patty, Jr. and Richard N. Wardell ABSTRACT: Fusion-cast refractory with the overwhelming majority of its crystalline mass being zirconia crystals and containing siliceous glass phase interstitially between the zirconia crystals. Composition analytically consists of, by weight, at least 62 percent $ZrO_2$, not more than 24 percent $SiO_2$, at least 1 percent $Al_2O_3$ not exceeding the amount of $SiO_2$, 0 to 10 percent oxide of Li, Na, K, Rb, Cs, Be, Mg, Ca, Sr, Ba or mixtures thereof, 0 to 4 percent fluorine, and not more than 1 percent $Fe_2O_3$ plus $TiO_2$. Useful in lining glass melting tanks. Characterized by being substantially crack-free as manufactured and less subject to cracking in service, and by minimal stoning, corrosion, and blistering in contact with many molten glasses, especially aluminosilicate, borosilicate and other glasses melted at temperatures of 1,550° C. or higher.

3,632,359

$ZrO_2$–$Al_2O_3$–$SiO_2$ FUSION-CAST REFRACTORY

BACKGROUND OF THE INVENTION

1. Field of the Invention

The present invention relates to refractory ceramic products of the type synonymously known in the art as "fusion-cast," "fused cast" and "heat cast" refractories, which are made by melting appropriate refractory raw material and casting the molten material into molds where it solidifies to form monolithic articles of desired shape. More specifically, the invention is concerned with improved fusion-cast refractory of the zirconia-alumina-silica type having particular value in forming the glass-contact lining and other structures of glass melting tanks or furnaces.

2. Description of the Prior Art

Heretofore, zirconia-alumina-silica fusion-cast refractories widely employed commercially have been of the type disclosed in U.S. Pat. No. 2,271,366, with $ZrO_2$ contents generally between 30 and 42 percent by weight. Typically, these refractories are characterized by being a mixture of two principal, interlocking, tightly bonded crystalline phases (i.e., corundum and zirconia crystals) and an interstitial glass phase. While these refractories perform well in contact with many glasses melted at temperatures not much above 1,500° C. and lower, they have been found to more readily react with many glasses melted at higher temperatures. For reasons not fully understood, such greater reaction results in the production of detrimentally larger numbers of loose crystalline particles of the refractory that float off into the glass melt within a given time period. Such crystal particles in a glass melt are referred to as stones, which form defects in articles subsequently formed of the glass. Also, a number of the molten glasses with higher melting temperatures cause undesirable rates of corrosive wear on the noted prior refractories.

The aforementioned prior art refractories have a further, very detrimental, stone-producing characteristic when, after having been in service as a lining of a melting tank producing sodium aluminosilicate glass, they are substantially cooled upon shutdown of the tank for repairs and then subsequently put back into the same service. Upon return to service, it has been found that the surface layers of these refractories in contact with the molten glass undergo exfoliation and disintegration that introduces a large number of small stones into the glass melt thereby creating intolerable defects in the glassware made therefrom, which defects render such glassware useless for its intended purpose.

The development of many new glass compositions requiring higher melting temperatures (i.e., 1,550°–1,650° C. or higher) has created a critical need for improved refractories that are not subject to the stoning and excessive corrosive wear noted above. Especially important is the need for refractories that will allow high production rates of high-quality glassware from such new glasses with minimal stone or other defects during the full useful life of the refractories.

One approach to reducing the corrosive wear of zirconia-alumina-silica fusion-cast refractories, which is suggested in U.S. Pat. No. 2,271,369, is to increase the $ZrO_2$ content above 60 percent by weight and decrease the $Al_2O_3$ content such that an amount of $Al_2O_3$ substantially in excess of the $SiO_2$ content remains to provide a reasonable melting temperature for commercially practical melting and casting of the refractory material. However, our experience in attempting to produce such higher $ZrO_2$ content refractories has shown that they have two serious shortcomings: (1) prevalent pernicious cracking of the cast bodies during cooling following solidification, even under controlled annealing conditions, that renders production of structurally sound, usable industrial product commercially impracticable, and (2) a marked tendency toward an unsatisfactory degree of potential of stoning. It has been recognized that the higher $ZrO_2$ content has a strong influence in causing the serious cracking problem. As is well known, the crystal structure of $ZrO_2$ transforms from the higher temperature tetragonal form to the lower temperature monoclinic form upon cooling down through a narrow temperature range of about 1,050°–900° C. This transformation is accompanied by an approximately 7 percent volume increase of the $ZrO_2$ crystals. Such volume increase is sufficient to cause cracking of a refractory body containing a substantial amount of $ZrO_2$ crystals.

Another suggestion, as in U.S. Pat. No. 2,352,530, has been to omit $Al_2O_3$ in high $ZrO_2$ fusion-cast refractory. However, this procedure causes unreasonably high melting temperatures that make it too difficult and expensive to melt and cast satisfactory products on a commercially practical basis. This situation is, of course, further aggravated by the fact that such higher melting temperatures cause a serious problem with volatilization of $SiO_2$ and other fluxes that is difficult to control. Such volatilization losses further increase the temperature necessary to provide sufficient molten material in a state that can be cast into molds without premature freezing leading to incompletely filled molds.

SUMMARY OF THE INVENTION

The present invention provides zirconia-alumina-silica fusion-cast refractory having high $ZrO_2$ content that can be readily manufactured on a commercially practical basis, even as large blocks customarily employed for lining glass melting tanks, without cracking or, at most in some cases, with only minor cracking of no material structural detriment to industrial usage. This refractory is further characterized by a combination of very low or minimal stoning potential, superior corrosion resistance and low tendency to form blisters when contacted by numerous molten glasses, particularly at temperatures of 1,550° to 1,650° C. and above. It is also characterized by thermal stability. In other words, the refractory will not be unduly adversely affected, as by cracking or spalling, while it ordinarily is in continuous service at elevated temperatures or in the event of furnace shutdown and subsequent reheating.

This invention is based upon the discovery of a critical relationship between $Al_2O_3$ and $SiO_2$ contents in high $ZrO_2$ fusion-cast refractory. It was found that the prevalent pernicious cracking and marked tendency toward unsatisfactory stoning potential, which occurred in the prior art refractory wherein the amount of $Al_2O_3$ employed was substantially greater than the amount of $SiO_2$ on a weight basis, could be prevented or rendered minimal by adjusting the $Al_2O_3$ and $SiO_2$ contents so that the weight ratio $Al_2O_3$:$SiO_2$ is less than or equal to 1.

In its broadest aspect, the fusion-cast refractory of the present invention comprises primarily crystalline zirconia with siliceous glass phase as a matrix between the zirconia crystals and it analytically consists of, by weight, at least 62 percent $ZrO_2$, not more than 24 percent $SiO_2$, at least 1 percent (preferably, at least 5 percent) $Al_2O_3$ but $Al_2O_3$ not exceeding the amount of $SiO_2$, 0 to 10 percent oxide of Li, Na, K, Rb, Cs, Be, Mg, Ca, Sr, Ba or mixtures thereof, 0 to 4 percent fluorine, and more more than 1 percent $Fe_2O_3$ plus $TiO_2$. In some cases, the refractory may also contain, within the glass phase matrix, minor amounts of mullite crystals and/or corundum crystals, the largest total amount of both being about 40–50 percent by volume of the total volume of glass phase and crystals of mullite and corundum present in the refractory when $Al_2O_3$ is at its maximum permitted amount in relation to $SiO_2$. Volume proportions of the mullite and/or corundum crystals larger than as noted in the preceding sentence (which can occur when $Al_2O_3$ exceeds $SiO_2$ on a weight basis) seem to be related in someway to the cause of the aforementioned prevalent pernicious cracking.

While satisfactory cast product with the very high $ZrO_2$ content may be made under more closely controlled fusion-casting procedures, it is somewhat difficult to avoid tendencies toward excessive porosity and cracking that yield undesirably high scrap levels. Therefore, for commercially practical production of fusion-cast product for most industrial purposes, the $ZrO_2$ content of such product should ordinarily not exceed 90 percent by weight.

The $SiO_2$ forms the matrix glass phase saturated with some of the $ZrO_2$ and $Al_2O_3$ and having a high softening point. However, since the glass phase has lesser refractoriness than the crystalline components, excessive amounts of the former result in a cast product subject to detrimentally reduced rigidity at elevated temperatures of service, unsatisfactory erosive and corrosive wear by a contacting glass melt, and objectionally increased stoning potential. Accordingly, it has been determined that $SiO_2$ should not exceed 24 percent by weight in order to obtain the excellent refractory product of this invention.

Fluorine and/or the oxides of alkali metals (Li, Na, K Rb, Cs) and/or of alkaline earth metals (Be, Mg, Ca, Sr, Ba) may be beneficially included in the refractory composition. These constituents will be found in the glass phase formed by $SiO_2$. They provide a dual effect of: (1) further inhibiting any cracking tendency by decreasing the amount of corundum and/or mullite relative to the glass phase and (2) acting as flux to somewhat lower the melting temperature so as to facilitate greater ease of melting and casting and to inhibit any tendency to form macroscopic porosity. For such purposes, the minimum retained amounts of such oxides and of fluorine should ordinarily be 0.5 and 0.03 percent by weight, respectively. However, as the retained amount of these constituents increase, corrosion resistance to molten glass tends to decrease and more so as the amounts get rather large. Also, rather large amounts of alkali oxides detrimentally decrease electrical resistivity of the refractory, which is not desirable for such refractory when it is to be used in a glass tank wherein melting is carried on by means of electrical current flowing through the glass melt. Therefore, in order to avoid these detriments, the total of such oxides and of fluorine should not exceed their respective maximum amounts stated above. In order to obtain the combination of a very high level of corrosion resistance and electrical resistivity with further improved cracking resistance and manufacturability, the total of these oxides and of fluorine should not analytically exceed, respectively, 3 and 2 percent by weight.

The total amount of iron and titanium oxides (with their analyses being reported in terms of $Fe_2O_3$ and $TiO_2$) must be limited as noted above because excessive amounts of these oxides are quite harmful in causing relatively poor corrosion resistance to molten glass by lowering the softening point of the glass phase and detrimental coloring of the molten glass. Accordingly, for making the refractory of this invention, it is necessary to employ raw materials with suitably low levels of these oxides as impurities. Preferably, their combined total amount is not more than 0.4 percent by weight.

Within the invention and even with the noted minimal amounts of alkali oxide or other flux, there are three compositional areas principally delineated by differing levels of $SiO_2$ content and characterized by tendencies toward relatively differing levels of porosity throughout the main bulk of the cast product, other than piping or central shrinkage holes whose presence or absence are mainly determined by the type of font or header drainage or by the refilling practice employed. The type of porosity involved with these differing tendencies is macroscopic closed pores apparently resulting from gases entrapped in the solidifying molten material. Of course, tendencies to form such pores may be mitigated by melting and casting larger volumes of refractory material and/or by suitable fining techniques that reduce gases in the molten material, such as by superheating prior to casting or by maintaining the molten condition for a greater length of time with or without stirring. Nevertheless, the differing tendencies observed for a large series of relatively small castings (4×4×6 inches) from a surface of each formed by cutting through the cast bodies can be described in relative terms as follows:

1. with 10 to 22 percent by weight of $SiO_2$, the tendency is to form quite dense castings with negligible to small amounts of very fine to medium size macroscopic pores, and 2. with less than 10 percent or more than 22 percent by weight of $SiO_2$ the tendency is to form somewhat less dense castings with relatively greater amounts of fine to coarse size pores (similar to results obtained when the noted flux components are omitted).

Of course, the closed pores are separated from each other by dense portions of the cast product and even the greater amounts of porosity that tend to occur in the latter two compositional areas mentioned above do not have any great adverse effect on resistance to corrosion by the lesser corrosion glasses having higher temperatures, such as sodium aluminosilicates or other aluminosilicates free of any substantial CaO content. However, the more substantial amounts of the closed porosity can contribute to undesirably lessened resistance to corrosion by the more corrosive types of higher melting temperature glasses, such as the calcium aluminosilicates. Moreover, the entrapped gases in the larger amounts of closed porosity can also contribute to a less desirable blistering tendency in the refining and forehearth treatment of some of the higher melting temperature glasses, such as borosilicate. Accordingly, the fusion-cast refractory of this invention that is most readily manufactured with advantageously high density in combination with the other characteristics noted before is one with 10 to 22 percent by weight of $SiO_2$, an amount of $ZrO_2$ that is not less than twice the total amount of $SiO_2$ plus $Al_2O_3$ and 0.5 to 10 percent (preferably 0.5 to 3 percent) by weight of oxide of alkali and/or alkaline earth metals (preferably $Na_2O$). However, a refractory of this invention with less than 10 percent by weight of $SiO_2$ plus 0.5 to 10 percent (preferably 0.5 to 3 percent) by weight of oxide of alkali and/or alkaline earth metals (preferably $Na_2O$ and preferably with $ZrO_2$ not in excess of 90 wt. percent) can be of advantage, especially when made in a manner to minimize macroporosity, for applications where the very high $ZrO_2$ content contributes distinctly better wear characteristics to the refractory.

Within the present invention, an exceptionally beneficial refractory is analytically composed of, by weight, 68 to 82.5 percent $ZrO_2$, 10 to 22 percent (preferably at least 15 percent) $SiO_2$, 0.5 to 2.5 percent $Na_2O$, not more than 1 percent (desirably less than 0.4 percent) $Fe_2O_3+TiO_2$, and $Al_2O_3$ in amount such that the ratio $Al_2O_3$:$SiO_2$ is 0.3 to 0.65. The latter ratio assures a very high manufacturing recovery rate of essentially crack-free cast products and restricts the amount of corundum and/or mullite crystals to no more than 25–30 percent by volume of the total refractory minus the volume of $ZrO_2$ crystals. Such refractory can be readily and consistently made with high density, extremely low stoning potential, superior corrosion resistance and low blistering. This unusual, improved combination of properties gives the refractory the desirable capability of being employed, with excellent performance, throughout glass melting tanks (below the superstructure) for melting a great number of glasses, especially those with melting temperatures of 1,550° C. or higher.

The refractory of this invention is produced, according to known fusion casting procedures, by mixing any suitable raw materials, melting such materials by any suitable technique that provides the oxidizing conditions which lead to low-blistering cast products (e.g., as in the "long arc" process of U.S. Pat. No. 3,079,452), and thereafter pouring the molten material into suitable molds followed by annealing of the castings (e.g., generally as set forth in U.S. Pat. Nos. 1,615,750 and 1,700,288). When employing the "long arc" process, care should be taken to feed the raw materials uniformly around outside of the electrode area so as to leave substantial melt surface exposed to continually renewed air atmosphere. At present, the most suitable mold known is assembled graphite slabs surrounded by alumina annealing powder. The thickness of the graphite slabs varies with the volume of the casting produced so as to avoid: (1) undesirable reaction between the cast refractory and the graphite that occurs when the graphite slab is too thin to cause sufficiently rapid chilling, and (2) undesirable cracking that occurs when the graphite slab is too thick such that it causes too rapid chilling. For 4×4×2 inches castings, a slab thickness of about three-fourths inch has been found very suitable, whereas larger thicknesses of about 1½ to 2½ inches are necessary for 10×18×18 inches castings. From these benchmarks, thicknesses needed for other size castings can be, and have been, readily determined with minimum trial efforts.

Suitable raw materials are readily chosen from among those commercially available materials of the type commonly employed for making $ZrO_2$–$Al_2O_3$–$SiO_2$ fusion-cast refractories and having appropriate purity for this invention. For example, the $ZrO_2$ and $SiO_2$ contents can be provided by a suitable mixture of refined zirconia and refined zircon sand. Among commercially available refined zirconia materials are crushed fused zirconia products that may contain some $Al_2O_3$ to contribute at least part of the desired amount of that constituent. The majority of $Al_2O_3$ content can be provided by high alumina material, such as Bayer-process alumina. For providing the other oxide and/or fluorine constituents, examples of suitable materials are high-purity grades of soda ash (sodium carbonate), calcium carbonate, fluorspar (calcium fluoride), aluminum fluoride and the like. By way of illustration, the following types of commercially available raw materials, whose typical analyses are given in weight percent, were used and found suitable in making the samples of refractory according to the present invention:

Fused Zirconia—84–99% $ZrO_2$, 0.4–11% $Al_2O_3$, 0.4–6% $SiO_2$, 0.15% max. $Fe_2O_3$, 0.4% max. $TiO_2$ and 0.3% max. CaO;

Zircon sand—32.34% $SiO_2$, 1% max. $Al_2O_3$, 0.2% max. $Fe_2O_3$, 0.2% max. $TiO_2$ and balance essentially $ZrO_2$;

Alumina—99% min. $Al_2O_3$, 0.5% max. $Na_2O$, 0.1% max. $SiO_2$ and 0.1% max. $Fe_2O_3$;

Soda ash—58–59% $Na_2O$ and balance essentially $CO_2$; and

Calcium carbonate—55–56% CaO and balance essentially $CO_2$.

It is well known that hafnium is commonly found in zirconium-bearing ores usually amounting to 1–4 wt. percent and is extremely difficult as well as expensive to remove from the ores. Therefore, refined raw materials (e.g., the fused zirconia and zircon sand noted above) produced therefrom contain such hafnium impurity in substantially the same form as the zirconium (viz oxide, silicate, etc.,) It has been commonly recognized that, in these ores and raw materials, hafnium is so indistinguishable from zirconium in physical properties and chemical behavior that, for practical purposes, it is considered as zirconium. Accordingly, every recitation of $ZrO_2$ content on an analytical basis in this specification and in the appended claims includes all $HfO_2$ impurity content combined therewith and is to be so construed.

DESCRIPTION OF THE PREFERRED EMBODIMENTS

In the further disclosure that follows, a number of electrically melted and cast samples, within and without the present invention, are set forth with their respective characteristics to better illustrate this invention. The data indicating the characteristics are determined by established standard procedures.

Evaluation of fusion-cast samples for cracking can be done in a number of ways, but the index rating system here used is based on direct visual comparison with a serial set of cracking standards. These standards are based upon number, extent and tightness vs. openness of cracks visible on the casting surfaces and, more especially, on surfaces of both vertical and horizontal cuts through the center of the casting. They were established after numerous tests by arbitrarily assigning a 4+ (very bad) index value to the greatest amount of cracking observed, a 1− (excellent) index value to the absence of visible cracking, and intermediate index values of 1 (good), 2 (fair), 3 (poor) and 4 (bad) to standards with differing levels of cracking between the two extremes ranging from one small tight crack through a few-too-many tight cracks to several large open cracks. If the casting was seen to be broken when it was removed from the mold, then the cracking index assigned to the casting took this fact into account. On this basis, the crack index data reported below is the result of the direct visual comparison with the standards and assigning proportionate index values to the standards to which the specimens are most closely comparable.

Data concerning molten glass corrosion characteristics of fusion-cast samples were determined on elongated refractory specimens having 1 centimeter square cross sections and suspended to a depth of about 1.5 centimeters in a melt of a particular glass at a predetermined temperature for a predetermined number of days, after which the specimens were withdrawn and cooled. The amount of cut or reduction in width of each specimen was then measured at two different locations: one at the melt line (i.e., the points on the specimen adjoining the air-glass melt interface) and a second location midway between the melt line and the end of the specimen which had been submerged in the glass melt. The smaller the cut at each location, the greater is the corrosion resistance of the refractory.

Stoning potentials of fusion-cast samples were also evaluated by a rating system based on microscopic visual comparison of the cooled withdrawn elongated specimens and corresponding cooled glass melts employed in the corrosion tests, as described in the preceding paragraph, with a serial set of reference standards. These reference standards are based upon the amount of stones and gas bubbles found in the cooled glass melt and in the glass adhering to the specimen, tightness vs. looseness of the crystalline structure or particles in the interface zone formed by contact of specimen with the glass melt and the extent of penetration into the specimen structure or leaching out of the glass matrix thereof by the contacting glass melt. Such standards were established after numerous tests by arbitrarily assigning a 4 (no unit) value to the greatest amount of stoning and the other related adverse factors observed, a zero value to the absence of all such factors, and intermediate values to differing levels of such factors between the two noted extremes. On this basis, the stoning potential data reported below is the result of the microscopic visual comparison with the standards and assigning proportionate rating values to the specimens relative to the rating values of the standards to which the specimens are most clearly comparable.

Composition data on 4×4×12 inches sample castings are given in table I and their respective characteristics or properties are given in table II. The stoning potential and corrosion cut data were obtained from specimens that were immersed for 4 days in a molten soda-aluminosilicate glass, at 1,600° C., having the following typical composition on a weight basis: 61.4% $SiO_2$, 16.82% $Al_2O_3$, 12.70% $Na_2O$, 3.64% $K_2O$, 3.67% MgO, 0.24% CaO, 0.77% $TiO_2$ and 0.75% $As_2O_3$. Consecutively tabulated sample numb 1369 through 1409 are within the present invention, and consecutively tabulated sample numbers 1400 through 4567 are outside of the invention. The latter are set forth to point up, by contrast, the distinctly different character of the present invention. In table I, those samples whose numbers are followed by the symbols (1) and (2) are within the correspondingly designated compositional areas noted in the Summary above and have the differing levels of porosity described therein. From table II, it is apparent that the products of the present invention, except in a few close-to-borderline composition situations, are characterized by fair-to-excellent cracking resistance, extremely low stoning potentials and good corrosion resistance. Even in the few borderline composition situations, these types of properties are of only a slightly less desirable character. In contrast, the lower part of the same table indicates the poor-to-very bad cracking and higher stoning potentials that typically result from other $ZrO_2$–$AlO_3$–$SiO_2$ fusion-cast products whose compositions are outside of the present invention. On the basis of the higher degree of cracking alone, the latter products are obviously not usable monolithic refractories for industrial purposes, such as linings in glass melting tanks. Although the relatively close-to-borderline sample number 2257 has almost a fair crack index, nevertheless, it exhibits the undesirably higher stoning potential typical for fusion-cast bodies with $Al_2O_3$:$SiO_2$ greater than unity. Moreover, the latter sample also exhibits detrimentally high corrosion wear at the melt line.

TABLE I

| Melt number | ZrO2 | Al2O3 | SiO2 | Na2O | CaO | Fe2O3 + TiO2 |
|---|---|---|---|---|---|---|
| 1369 (1) | 76.2 | 1.5 | 20.6 | 1.4 | 0.1 | 0.2 |
| 678 (1) | 66.4 | 14.1 | 17.7 | 1.5 | 0.1 | 0.2 |
| 830 (1) | 63.6 | 14.0 | 17.8 | 4.3 | 0.1 | 0.2 |
| 1983 | 72.1 | 10.8 | 16.5 | 0.3 | 0.1 | 0.2 |
| 851 (1) | 71.1 | 10.4 | 16.7 | 1.5 | 0.1 | 0.2 |
| 1407 (1) | 69.6 | 14.2 | 14.7 | 1.4 | 0.0 | 0.1 |
| 1366 (1) | 78.4 | 4.9 | 15.0 | 1.4 | 0.1 | 0.2 |
| 1367 (1) | 77.2 | 7.1 | 13.9 | 1.4 | 0.1 | 0.2 |
| 1992 (1) | 79.8 | 5.9 | 13.6 | 0.4 | 0.1 | 0.2 |
| 1991 (1) | 77.9 | 9.3 | 12.3 | 0.2 | 0.1 | 0.2 |
| 4556 | 85.4 | 5.8 | 8.4 | 0.0 | 0.2 | 0.2 |
| 4560 (2) | 84.7 | 5.7 | 8.3 | 0.9 | 0.2 | 0.2 |
| 4565 (2) | 83.2 | 5.6 | 8.1 | 0.0 | 2.8 | 0.2 |
| 1371 (2) | 88.7 | 2.4 | 7.6 | 0.8 | 0.2 | 0.3 |
| 1372 (2) | 85.6 | 6.2 | 6.7 | 1.1 | 0.2 | 0.2 |
| 1995 (2) | 70.8 | 5.9 | 22.1 | 0.8 | 0.1 | 0.2 |
| 1409 (2) | 71.4 | 3.5 | 23.4 | 1.7 | 0.0 | 0.0 |
| 1400 | 56.0 | 22.9 | 19.0 | 1.9 | 0.0 | 0.2 |
| 833 | 58.2 | 23.0 | 17.0 | 1.6 | 0.0 | 0.2 |
| 1393 | 65.0 | 22.6 | 10.4 | 1.7 | 0.1 | 0.2 |
| 1399 | 66.9 | 21.5 | 9.8 | 1.6 | 0.0 | 0.2 |
| 1921 | 68.7 | 17.1 | 13.9 | 0.0 | 0.1 | 0.2 |
| 848 | 67.0 | 19.1 | 12.0 | 1.6 | 0.1 | 0.2 |
| 2257 | 71.9 | 14.7 | 12.2 | 0.8 | 0.1 | 0.2 |
| 1386 | 76.3 | 14.8 | 7.2 | 1.3 | 0.1 | 0.2 |
| 1385 | 78.4 | 10.4 | 9.7 | 1.2 | 0.1 | 0.2 |
| 1383 | 80.1 | 10.3 | 8.0 | 1.3 | 0.1 | 0.2 |
| 1387 | 80.4 | 15.3 | 2.8 | 1.1 | 0.2 | 0.2 |
| 1374 | 86.1 | 10.8 | 2.0 | 0.7 | 0.2 | 0.2 |
| 4567 | 84.0 | 7.5 | 5.4 | 0.0 | 2.8 | 0.2 |

TABLE II

| Sample number | Al2O3/SiO2 | Crack index | Stoning potential | Corrosion cut, mm. Melt line | Corrosion cut, mm. Mid-point |
|---|---|---|---|---|---|
| 1369 | 0.22 | 1− | <0.5−0.5 | 0.65 | 0.16 |
| 678 | 0.80 | 1+ | <0.5 | 0.37 | 0.13 |
| 830 | 0.79 | 1− | <0.5 | 0.41 | 0.05 |
| 1983 | 0.65 | 1− |  | 0.52 |  |
| 851 | 0.62 | 1− | <0.5 | 0.52 | 0.18 |
| 1407 | 0.97 | 2 | 0.5−1 | 0.54 | 0.12 |
| 1366 | 0.33 | 1+ | <0.5 | 0.56 | 0.09 |
| 1367 | 0.51 | 1+ | <0.5−0.5 | 0.51 | 0.16 |
| 1992 | 0.43 | 1− |  |  |  |
| 1991 | 0.75 | 1− |  |  |  |
| 4556 | 0.70 | 2 |  |  |  |
| 4560 | 0.70 | 1+ |  |  |  |
| 4565 | 0.69 | 3− |  |  |  |
| 1371 | 0.32 | 1− | <0.5 | 0.50 | 0.14 |
| 1372 | 0.93 | 3− | <0.5 | 0.51 | 0.12 |
| 1995 | 0.29 | 2 |  | 0.56 | 0.13 |
| 1409 | 0.15 | 2 | <0.5 | 0.56 | 0.13 |
| 1400 | 1.21 | 4+ | 1.5−2 | (1) |  |
| 833 | 1.36 | 3+ | 2.5−3 | (1) |  |
| 1393 | 2.19 | 4 | 1−1.5 | −.65 | 0.17 |
| 1399 | 2.18 | 4+ | 1 | 0.71 | 0.19 |
| 1921 | 1.23 | 4+ |  |  |  |
| 848 | 1.59 | 4 | 1 | 0.49 | 0.08 |
| 2257 | 1.21 | 2+ | 1 | 0.71 | 0.08 |
| 1386 | 2.03 | 4+ | 0.5 | 0.50 | 0.08 |
| 1385 | 1.28 | 3 | 0.5−1 | 0.57 | 0.18 |
| 1383 | 1.27 | 3 |  |  | 0.10 |
| 1387 | 5.50 | 4+ | 1 | 0.50 | 0.10 |
| 1374 | 5.45 | 4 | 0.5−1 | 0.46 | 0.09 |
| 4567 | 1.39 | 3+ |  |  |  |

1 Cut off.

Larger sample castings (e.g., 10×18×18 inches, 12×18×21 inches, etc.) were made and specimens of these castings were tested for corrosion and stoning potential, as described previously, against nine different glass melts that require the higher melting temperatures. The results of these tests are set forth in table III, which further illustrate the superior characteristics of the present invention.

TABLE III

| Sample casting | Glass | Temp., °C. | Days | Stoning potential | Corrosion Cut, mm. Melt line | Corrosion Cut, mm. Mid-point |
|---|---|---|---|---|---|---|
| A | 1 | 1,600 | 4 | <0.5 | 0.30 | 0.08 |
| B | 1 | 1,600 | 4 | 1.5−2 | 0.70 | 0.22 |
| A | 2 | 1,600 | 4 | <0.5 | 0.47 | 0.08 |
| B | 2 | 1,600 | 4 | 1.5−2 | 0.78 | 0.15 |
| A | 3 | 1,550 | 7 | <0.5 | 0.06 | 0.00 |
| B | 3 | 1,550 | 7 | 1 | 0.16 | 0.17 |
| A | 4 | 1,550 | 7 | <0.5 | 0.17 | 0.12 |
| B | 4 | 1,550 | 7 | 1.5−2 | 0.52 | 0.43 |
| A | 5 | 1,550 | 7 | <0.5 | 0.12 | 0.06 |
| B | 5 | 1,550 | 7 | 0.5−1 | 0.25 | 0.13 |
| A | 6 | 1,550 | 7 | <0.5 | 0.14 | 0.11 |
| B | 6 | 1,550 | 7 | 1 | 0.18 | 0.13 |
| A | 7 | 1,550 | 5 | <0.5 | 1.04 | 0.61 |
| B | 7 | 1,550 | 5 | 0.5 | 1.99 | 0.65 |
| A | 8 | 1,600 | 4 | <0.5 | 0.23 | 0.12 |
| B | 8 | 1,600 | 4 | 2−2.5 | 1.13 | 0.41 |
| A | 9 | 1,550 | 7 | <0.5 | 1.65 | 0.33 |
| B | 9 | 1,550 | 7 | 1−1.5 | 3.04 | 1.72 |

Castings identified as A, illustrative of the present invention, were made of the raw materials previously described and in the following proportions by weight: 51.33 parts fused zirconia, 41.56 parts zircon, 4.71 parts alumina and 4.25 parts soda ash. Such mixture yielded an average chemical analysis, on a weight basis, as follows: 71±2% $ZrO_2$, 10.5±1% $Al_2O_3$, 17±1% $SiO_2$ and 2.1±0.2% $Na_2O$.

Representative of one of the best $ZrO_2$–$Al_2O_3$–$SiO_2$ fusion-cast refractories commercially available prior to this invention for glass melting tank linings are the castings identified as B and made from the previously described raw materials in the following proportions by weight: 17.0 parts fused zirconia, 38.0 parts zircon, 43.9 parts alumina and 1.87 parts soda ash. This mixture yielded an average analysis, on a weight basis, as follows: 39.89% $ZrO_2$, 45.61% $Al_2O_3$, 13.39% $SiO_2$ and 1.10% $Na_2O$.

Glass 1 is the soda-aluminosilicate glass whose composition was described previously. Typical analyses of the other glasses indicated in table III, on a weight basis, are as follows:

Glass 2
60.97% $SiO_2$, 16.99% $Al_2O_3$, 12.91% $Na_2O$, 3.42% $K_2O$, 3.50% $MgO$, 0.38% $CaO$, 0.75% $As_2O_3$, 0.48% $FeO$ and 0.60% $SnO_2$;

Glass 3
79.81% $SiO_2$, 12.23% $B_2O_3$, 2.79% $Al_2O_3$, 3.97% $Na_2O$, 0.40% $K_2O$ and 0.80% $CaO$;

Glass 4
65.4% $SiO_2$, 15.3% $B_2O_3$, 9.0% $Al_2O_3$, 2.1% $Na_2O$, 3.1% $K_2O$, 3.0% $BaO$, 1.1% $Li_2O$ and 1.0% $KCl$;

Glass 5
68.55% $SiO_2$, 19.28% $B_2O_3$, 5.73% $PbO$, 4.14% $Na_2O$, 0.12% $K_2O$, 1.66% $As_2O_3$ and 0.52% $Al_2O_3$;

Glass 6
76.4% $SiO_2$ 15.6% $B_2O_3$, 4.8% $Na_2O$, 0.25% $K_2O$, 1.8% $Al_2O_3$, 0.9% $As_2O_3$, 0.11% $Li_2O$ and 0.14% fluorine;

Glass 7
54.4% $SiO_2$, 17.5% $CaO$, 14.2% $Al_2O_3$, 7.7% $B_2O_3$, 0.4% $Na_2O+K_2O$, 4.8% $MgO$, 0.2% $TiO_2$, 0.5% $Fe_2O_3$ and 0.1% $ZrSiO_4$;

Glass 8
69.7% $SiO_2$, 17.8% $Al_2O_3$, 4.3% $Li_2O$, 4.3% $TiO_2$, 3.1% $BaO$ and 0.8% $As_2O_3$; and Glass 9
30.55% $SiO_2$, 37.64% $Al_2O_3$, 24.17% $CaO$ and 7.64% $CaCl_2$.

We claim:

1. Fusion-cast refractory comprising primarily crystalline zirconia with siliceous glass phase as a matrix between the zirconia crystals, said refractory analytically consisting of, by weight:
   a. at least 62 percent $ZrO_2$,
   b. not more than 24 percent $SiO_2$,
   c. at least 1 percent $Al_2O_3$ but $Al_2O_3$ not exceeding the amount of $SiO_2$,
   d. 0 to 10 percent oxide of metal selected from Li, Na, K, Rb, Cs, Be, Mg, Ca, Sr, Ba and mixtures thereof,
   e. 0 to 4 percent fluorine, and
   f. not more than 1 percent $Fe_2O_3$ plus $TiO_2$.

2. Fusion-cast refractory of claim 1 wherein $ZrO_2$ does not exceed 90 percent.

3. Fusion-cast refractory of claim 1 containing a minor amount of other crystals selected from corundum and mullite, and wherein the volume of said other crystals does not exceed 50 percent of the total volume of said glass phase and said other crystals.

4. Fusion-cast refractory of claim 1 wherein:
   a. the amount of $ZrO_2$ is at least twice the total amount of $SiO_2$ plus $Al_2O_3$,
   b. $SiO_2$ is 10 to 22 percent, and
   c. said selected metal oxide is at least 0.5 percent.

5. Fusion-cast refractory of claim 4 wherein said selected metal oxide does not exceed 3 percent.

6. Fusion-cast refractory of claim 5 wherein said selected metal oxide is $Na_2O$.

7. Fusion-cast refractory of claim 6 wherein:
   a. $ZrO_2$ is 68 to 82.5 percent,
   b. $Na_2O$ is 0.5 to 2.5 percent, and
   c. $Al_2O_3$ is present in an amount to provide a ratio of $Al_2O_3:SiO_2$ in the range of 0.3 to 0.65.

8. Fusion-cast refractory of claim 7 containing a minor amount of other crystals selected from corundum and mullite, and wherein the volume of said other crystals does not exceed 30 percent of the total volume of said glass phase and said other crystals.

9. Fusion-cast refractory of claim 1 wherein:
   a. $SiO_2$ is less than 10 percent, and
   b. said selected metal oxide is at least 0.5 percent.

10. Fusion-cast refractory of claim 9 wherein said selected metal oxide does not exceed 3 percent.

11. Fusion-cast refractory of claim 10 wherein said selected metal oxide is $Na_2O$.

12. Fusion-cast refractory of claim 9 wherein $ZrO_2$ does not exceed 90 percent.

* * * * *

UNITED STATES PATENT OFFICE
CERTIFICATE OF CORRECTION

Patent No. 3,632,359         Dated January 4, 1972

Inventor(s) Allen M. Alper-Ronald M. Lewis-Robert N. McNally

It is certified that error appears in the above-identified patent and that said Letters Patent are hereby corrected as shown below:

Column 2, line 56, delete "more" first occurrence and insert -- not --.

Column 4, line 17, after "as" insert -- a --.

Column 6, line 47, change "61.4% $SiO_2$" to -- 61.41% $SiO_2$ --;

line 49, change "numb" to -- numbers --.

Signed and sealed this 25th day of July 1972.

(SEAL)
Attest:

EDWARD M. FLETCHER, JR.　　　　　ROBERT GOTTSCHALK
Attesting Officer　　　　　　　　　Commissioner of Patents